Oct. 2, 1962  R. J. WENTE  3,056,455
TURBOPROP CONTROL
Filed Sept. 23, 1959  2 Sheets-Sheet 1

INVENTOR.
Robert J. Wente
BY
Paul Fitzpatrick
ATTORNEY

Oct. 2, 1962 R. J. WENTE 3,056,455
TURBOPROP CONTROL
Filed Sept. 23, 1959 2 Sheets-Sheet 2

INVENTOR.
Robert J. Wente
BY
Paul Fitzpatrick
ATTORNEY 3,056,455
TURBOPROP CONTROL
Robert J. Wente, Indianapolis, Ind., assignor to General Motors Corporation, Detroit, Mich., a corporation of Delaware
Filed Sept. 23, 1959, Ser. No. 841,780
7 Claims. (Cl. 170—135.74)

My invention relates to controls for gas turbine propeller aircraft power plants, commonly referred to as turboprop power plants or engines. The principal purpose of the invention is to provide a simple and flexible control system particularly suited to the operational requirements of turboprop powered aircraft. A particular feature of the system lies in the provision of simple, convenient, and effective means for trimming the power of an engine so as to facilitate fine adjustments of the power output of the engine and thus make is easy to match the operation of a number of engines in a multi-engined aircraft.

The nature of the invention and the advantages thereof will be apparent to those skilled in the art from the succeeding description of the preferred embodiment thereof and the accompanying drawings.

By way of introduction to this description, it may be pointed out that a control system according to the invention preferably comprises a first control operable by the aircraft pilot, which may be termed a power control or power lever, and which is coupled to the fuel control of the engine and to the propeller so as to provide for normal control of the engine and propeller in flight and during ground operation. It also includes a condition lever operable by the pilot which preferably performs three functions: it provides a fine or trimming adjustment of the fuel control to adjust the power output of the engine; it operates means for shutting down the engine such as a fuel cutoff valve; and it also is operable to cause the propeller to feather in addition to shutting down the engine.

Referring to the drawings, FIGURE 1 is a simplified elevation view of the front end of a turboprop power plant, with certain parts in section.

Figures 1, 2:
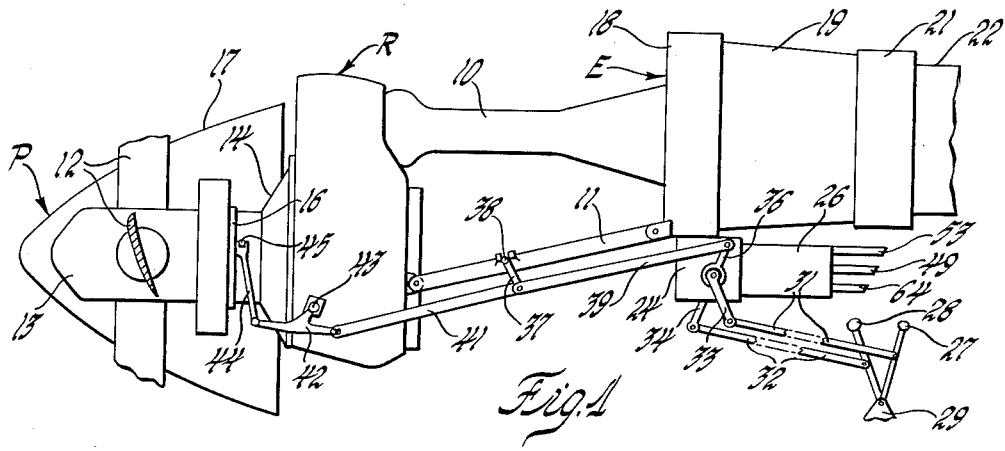
FIGURE 2 is a schematic drawing of the control system showing the major elements thereof.

Referring first to FIGURE 1, the turboprop power plant comprises a variable pitch feathering propeller P mounted on and driven through a reduction gear assembly R which, in turn, is driven by a gas turbine E. The reduction gear is fixed to the engine by a shaft housing 10 and by two struts 11, one at each side of the engine and reduction gear. The shaft housing encloses a shaft which delivers the power output of the engine to the reduction gear. This arrangement may be essentially the same as that described in U.S. Patent 2,718,756.

The propeller P is preferably of a type which is operable in reverse pitch for braking and ground maneuvering, in fixed blade angle or beta control for taxiing, and in a speed governing mode of operation for normal flight, and which may be feathered in the event of casualty to the power plant.

Propellers of this general type are disclosed in U.S. Patents 2,307,102, 2,669,312, 2,699,304, and 3,003,566. The propeller disclosed in Patent No. 3,003,566 employs speed governing in the reverse pitch mode of operation. In the other propellers referred to, reverse thrust is obtained in blade angle, or beta, control. This distinction is immaterial to the invention, and it may be pointed out that the details or nature of the propeller are immaterial, so long as it is of such character that its operation may be successfully coordinated with that of the engine.

As illustrated, the propeller comprises four blades 12 mounted on a rotating hub 13 which contains mechanisms for setting the pitch of the propeller blades. The propeller includes a non-rotating portion 14 which is bolted to the reduction gear R. It includes a settable input means 16 which may include a control ring rotatable about the axis of the propeller to set the propeller to the desired blade angle in beta control, to set the governor to the desired speed in governing control, to feather the propeller, and to operate the propeller in reverse pitch (either by blade angle or governing control). The settable input means 16 is adjusted by the pilot by mechanism to be described. The hub of the propeller is enclosed in a fairing or spinner 17.

The engine E as illustrated includes an air inlet section 18, a low pressure compressor 19, an inter-compressor frame 21, and a high pressure compressor 22. The engine also includes combustion apparatus, a high pressure turbine coupled to the high pressure compressor, a low pressure turbine coupled to the low pressure turbine and the reduction gear R, and a suitable exhaust duct. These are not illustrated.

While the invention is applicable to a dual-spool engine, as described, it is also applicable to a free turbine engine, to a single spool engine, or to other types of engines having characteristics adapting them to the mode of control to be described.

The basic control of the power plant lies in the control of the propeller and in the control of the fuel supply to the engine. Coordination of the control of the propeller and fuel are effected through a coordinating control or coordinator 24 mounted on the air inlet housing 18. A fuel control 26 is mounted on the engine, and may be mounted on the coordinator. Control of the power plant is effected by the pilot through a condition control lever 27 and a power control lever 28 mounted on a suitable control stand 29. These are coupled by suitable transmission means, illustrated by the links 31 and 32 and rotatable arms 33 and 34, to input shafts (not illustrated) of the coordinator.

The coordinator includes a shaft, not illustrated, which drives an output arm 36 coupled to the settable input means 16 of the propeller. The connecting means may comprise a suspension arm 37 pivoted at 38 to a strut 11, a pushrod 39 coupled to arms 36 and 37, and a pushrod 41 connected to arm 37 and to a bellcrank lever 42 pivotally mounted at 43 on the reduction gear R. A rod 44 connects the other end of the bellcrank to an arm 45 on the settable control means 16. Means, not illustrated in FIGURE 1, are provided to transmit certain inputs to the fuel control 26 from the coordinator 24. The structural details of the coordinator and control linkages are immaterial to the invention and may be of any suitable character. They are preferably of the type described in U.S. Patent 2,860,712, which illustrates suitable control linkage rigging and a suitable type of coordinator structure.

As will be pointed out, the control arm 36 is operated normally by the power control 28, but is coupled to the condition control 27 in one range of the movement thereof. This operation by the condition lever drives the settable input 16 to its ultimate position which causes feathering of the propeller.

A suitable coordinating control and fuel control are illustrated schematically in FIGURE 2. It will be understood that no attempt is made to illustrate intricacies of the fuel control, since these are irrelevant to a description of the invention. Also, elements of the coordinating control which are not material to understanding this invention are omitted. Fuel is supplied to the engine from any suitable source such as aircraft boost pumps through a conduit 47, fuel pumping means 48 preferably driven by the engine, a conduit 49, a main fuel metering valve 50, a cutoff valve 52, and conduit 53 to the engine.

The amount of fuel supplied to the engine is determined by the area of a variable port or ports in the metering valve 50 and the pressure drop or metering head across these ports. The metering valve may comprise, as illustrated in elementary form, a cylinder 54 and a plunger 56 movable axially of the cylinder to throttle a metering port 57. Plunger 56 is moved by suitable control means 58, which may be referred to as a fuel computer, in the fuel control. The fuel computer receives a control input or inputs from the power control 28 and inputs representing parameters or conditions of operation of the engine such as temperature, pressure, and rotational speed. More specifically, such a control may respond to engine inlet temperature, to pressure in the engine inlet or at some stage of the compressor including the outlet of the high pressure compressor, and to rotational speed of the turbine or turbines of the engine. Preferred metering valves vary port area both by axial movement and by rotation of a movable valve member as illustrated, for example, in U.S. patent No. 2,978,034. However, the simplified illustration is sufficient to explain the principles of our invention. The fuel computer 58 and main metering valve 50 may be termed the main fuel regulator.

As previously stated, the control system comprises trimming means for varying to a limited extent the power output of the engine. The preferred mode of accomplishing this to to vary the head across the metering valve 50, so that a fuel control adapted to this form of trimming is preferred.

For this purpose, the fuel control includes a bypass valve 60 including a cylinder 61 and a reciprocable valve piston 62. The upper face of piston 62 is connected to the outlet of pump 48 by a line 63 and to the inlet of the pump by a line 64 entering the side of the cylinder 61 at a throttling port 66, the area of which is varied by movement of piston 62. Piston 62 is biased in the port opening direction by the pump discharge pressure. It is biased in the closing direction by a compression spring 67 and a variable servo fuel pressure in chamber 68 below the piston.

This variable pressure is determined by a head regulating pilot valve 70 comprising a cylinder 71 and a valve spool 72 reciprocable in the cylinder. The valve spool has three lands. The center land 73 blocks a port connected through a line 74 to chamber 68 in the neutral position of the valve, as illustrated. Fuel at pump discharge pressure, which is metering valve inlet pressure, is conducted through line 76 to a port in cylinder 71 above land 73 and by a branch conduit 76' to a chamber 77 below the valve spool. Metering valve outlet pressure is conducted by line 78 to a chamber 79 above valve spool 72. Line 81 connects the cylinder 71 below land 73 to the pump inlet through bypass outlet line 64.

Spool 72 is biased upwardly by metering valve inlet pressure. It is biased downwardly by metering valve outlet pressure and by the force of a spring 82 compressed between spool 72 and an abutment piston 83 slidable in cylinder 71. The position of abutment 83 is determined by a cam 84 rotated by an arm 86 connected, by means to be described, to the condition control 27. Valve spool 72 will be in its neutral position as shown at a metering head or pressure difference across the metering valve determined by the force of spring 82 which, in turn, is determined by the setting of arm 86. If the metering head should increase above the predetermined value, spool 72 will move upwardly, opening line 74 to pump inlet pressure, reducing the pressure in chamber 68 and causing piston 62 to increase the opening of port 66 and bypass a greater portion of the pumped fuel. If the metering head is below the preset value, spool 72 will move downwardly to supply fuel at pump outlet pressure to chamber 68 and reduce the amount of fuel bypassed. It will be apparent that the metering head which is maintained will be determined directly by the position of abutment 83 which changes the load of spring 82.

The cutoff valve 52, which may be of any suitable type, is indicated as having a cylindrical body 88 within which a valve member 89 is rotated. The valve is shown in its open position, and is closed by rotation of member 89 counterclockwise. Member 89 is rotated by an arm 91 operated by the condition control 27 through means which will be described.

The fuel computer is controlled by one or more inputs from the power control 28. In the preferred type of control illustrated, the fuel computer receives a governor setting input through a movable member such as a pushrod 92 and a power or turbine temperature setting through a movable member such as a pushrod 93. These members may be coupled by bellcranks 94 and 96 to slidable cam followers 97 and 98 connecting the fuel control to the coordinator. The cam followers 97 and 98 are moved by cam tracks 99 and 101 in a cam plate 102 moved by the power lever. As illustrated schematically, the cam plate is mounted on and moved by a reciprocably guided member 103 which is suitably connected to the power control input arm 34 of the coordinator by means not illustrated.

A second reciprocable member 106 connected to the condition lever 27, as through arm 33, mounts cam plates 107 and 108. Cam plate 107 defines a cam track or slot 109 which reciprocates a follower 111, the other end of which is connected to the setting arm 86 of the head regulating valve 70. Cam 108 defines a cam slot 112 which operates a cam follower 113 connected to the operating arm 91 of the fuel cutoff valve.

The coordinating control operates a propeller control member 120 which is connected to the settable input means 16 of the propeller, as through arm 36. Member 120 may be moved to adjust the propeller input means 16 over its entire range from maximum reverse through beta control and forward thrust governing control to the feather position, as indicated by the legends. Propeller control member 120 is selectively coupled by a discriminator 121 to the movable members 103 and 106.

As illustrated schematically, the member 120 has a head 122 which may be engaged either by the end 123 of member 103 or by an arm 124 fixed to the member 106. The operation of the discriminator is such that member 120 is positively bidirectionally coupled either to member 103 or 106 and is coupled to that one which has moved farthest in a direction to move the propeller control toward the feather position to move with it in either direction.

It may be pointed out that the illustration of the coordinator and discriminator as structures primarily of a reciprocating nature is adopted for clarity of illustration and elimination of structural complications on the schematic. While such members may be as illustrated, they may preferably, as a matter of practice, be rotatable. A coordinator structure comprising rotatable cam means, rotatable power and condition inputs, and a rotatable propeller control shaft, and output means connected to the fuel control is illustrated in Patent 2,860,712 previously referred to. Such mechanism may be employed as a matter of structural design. The employment of rotatable members facilitates adjustment of the control linkages and accords with the use of a simple and compact discriminator such as that described in Patent 2,860,712 and also in Patents 2,778,241 and 2,836,987.

Output member 120 is coupled to member 103 in normal operation of the power plant so that the position of the power control 28 determines the mode of operation of the propeller, such as its blade angle or the speed setting of the governor. Since the power control also controls the engine through the connection of means 99 and 101 to the fuel computer, coordination of the engine and propeller is readily established. The forms of the cams may be determined with respect to the characteristics of the particular propeller, engine, and aircraft installation to provide harmonious operation of the engine and propeller and a simple one-lever control of the operation of both under most conditions.

Movement of the input member 102 as illustrated in FIGURE 2 from its lowermost to its uppermost position resets the engine power and speed schedules as the power lever 28 is moved through its quadrant, and also controls the propeller as described. However, the power control 28 does not and cannot move the settable input means of the propeller to the feather position. This is accomplished by the condition control input which overtravels the power control input when the condition control 27 is moved to its extreme position, and moves member 120 to its feather position.

Figure 3:
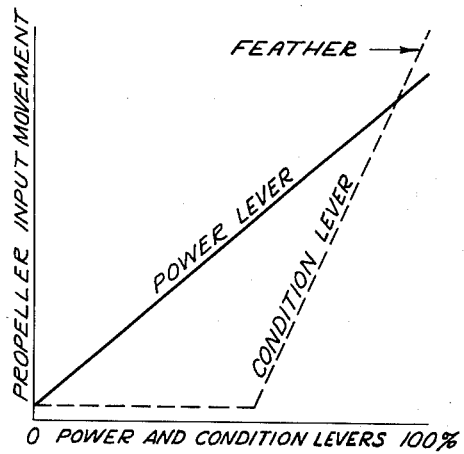
FIGURE 3 is a chart illustrating the coupling of the power and condition controls of the propeller.

This mode of operation is illustrated in FIGURE 3 in which the line indicated as power lever illustrates the substantially linear and progressive movement of the settable input of the propeller as the power control is moved from the initial position of its range, indicated as zero, to the maximum position indicated as 100%. The condition control input to the discriminator is less than that of the power control input through most of its range of movement and therefore this movement of the condition lever does not affect the propeller, as indicated by the broken line. However, in about the final 10% of the range of movement of the condition lever, its input to the discriminator travels beyond the maximum input from the power control to the discriminator, and moves the propeller input means to the feather position.

Figure 4:
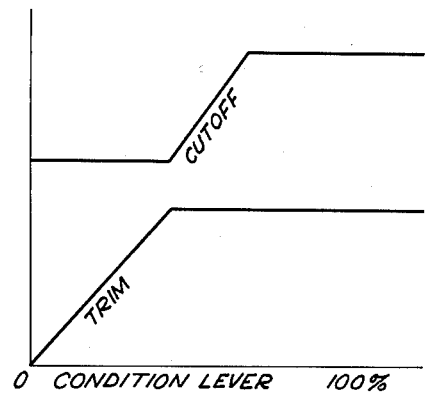
FIGURE 4 is a chart illustrating the operation of the fuel trim and cutoff means by the condition control.

FIGURE 4 illustrates the other functions of the condition control lever, the operation of the fuel trim and the fuel cutoff as the condition control lever is moved over its range indicated as from zero to 100%. Through a first range of movement from zero to about 35% of the total range of movement of the condition control lever, it transmits movement to the metering head setting arm 86. As will be apparent by reference to FIGURE 2, the initial portion of cam track 109 is sloped whereas the terminal portion is parallel to the direction of movement of 106.

From about 35% to about 50% movement of the condition control lever, it moves the fuel cutoff valve to its closed position. This constitutes a second range of movement of the condition control lever. As will be seen, the central portion of cam track 112 is sloped and the end portions are parallel to the movement of the cam. After considerable further travel of the condition control lever, it operates through the discriminator to feather the propeller as previously described.

Figure 5:
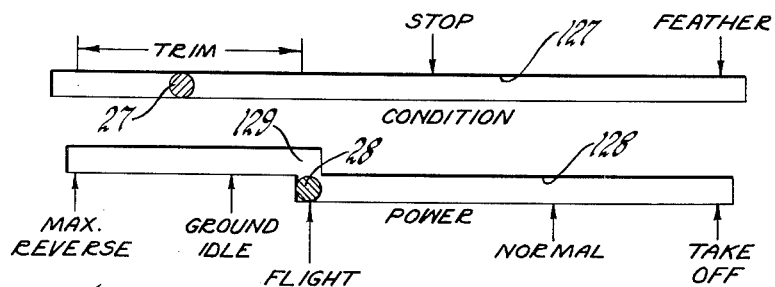
FIGURE 5 is a diagram illustrating the operating ranges of the power and condition levers.

FIGURE 5 additionally illustrates the operation of the condition and fuel controls in terms of a typical control quadrant for the levers 27 and 28. Condition control lever 27 may move in a slot 127. The trim range of condition lever 27, the stop position at which fuel to the engine is cut off, and the ultimate feather position in which the propeller is feathered, are illustrated.

The power lever is movable in a slot 128 from a maximum reverse position at zero to a takeoff position at 100%. A gate is provided at 129 in the flight idle position of the power control. The range from flight idle through normal power to takeoff represents the normal flight operating range of the engine. The range below the gate through ground idle to maximum reverse thrust may be employed for ground maneuvering of the aircraft.

The propulsion of the aircraft is normally controlled by the pilot by manipulation of the power control 28 for each engine. The power control determines the power output of the engine and also the mode of operation of the propeller. In the flight range, the power control 28 determines the setting of the propeller governor if it is a variable speed governor as in the embodiment described here. However, this invention is valuable whether the propeller governor setting is variable by the power control or not.

At this point, it should be mentioned that the control system of this invention is particularly important and desirable in multi-engine aircraft installations. If, for example, four engines are installed in an aircraft, modern practice requires that the propellers be synchronized and preferably synchrophased. For this purpose, the propellers include means subject to a master control for varying slightly the settings of the propeller governors, or of all but one of the governors, to synchronize the operation of the propellers. Such synchronizing adjustment has a very small range, of the order of 1% increase or decrease of the speed setting. Therefore, for the propeller synchronizer to work, it is necessary that the pilot's setting of the governors by the power levers 28 be very nearly the same.

However, in view of individual variations between power plants and fuel controls, when the power control levers for a number of engines are set to the same propeller governor setting, the engines may not be operating at the same power level. It is also desirable to balance the engines, either in terms of torque output which may be determined by a torquemeter, or in terms of turbine temperature which may be determined by thermocouples and a temperature indicator for each engine. The trim control effected by the condition lever 27 makes it possible and convenient to balance the engine power outputs without disturbing the setting of the power control levers and thereby the settings of the propeller governors.

Therefore, if the initial movement of the several power control levers to the desired position leaves the engines out of balance, the pilot may adjust the condition levers to correct this unbalance. Preferably, a total variation of fuel of about 12%, that is, 6% in either direction from a mean setting, may be obtained by movement of control 27 through the trim range. Since this trim or compensation of fuel flow is effected through about 35 degrees of movement of the condition control lever, a very sensitive or vernier control may readily be obtained. The advantages of this sensitive power control are evident even where the propeller speed setting is constant in the flight range.

If the pilot wishes to stop an engine, he may do so simply by moving the condition control forward to the stop position, which immediately stops the supply of fuel to the engine. If it should be desirable to feather a propeller because of some failure of the propeller, of the engine, or the fuel supply, it is necessary only to move the condition control all the way to its feather position, which shuts off the engine as it passes the stop position and initiates feathering of the propeller when it reaches the feather position.

The advantages of the invention in terms of flexibility, accuracy and ease of control of the engines of a multi-engine or even a single engine aircraft will be apparent. A further advantage of the invention lies in the very simple means employed to effect the trimming control. To point this out more clearly, a fuel control lacking the trimming arrangement of the invention may be the same as the fuel control described except for the omission of the setting means 84 to adjust metering head operated by the condition control.

It will be apparent to those skilled in the art that many types of known mechanisms may be used to perform the functions of the various elements shown in FIGURE 1 and illustrated schematically in FIGURE 2.

The description of the preferred embodiment of the invention for the purpose of explaining the principles thereof is not to be considered as limiting or restricting the invention, since many modifications may be made by the exercise of skill in the art within the scope of the invention.

I claim:

1. A control system for a turboprop power plant including a gas turbine engine and a variable pitch feathering propeller driven thereby, the propeller having settable input means determining the mode of operation of the propeller, the control system comprising, in combination, a settable power control, a settable condition control; a fuel control including a main fuel regulator adapted to meter fuel to the engine and a settable trimming means connected to the fuel regulator adapted to increase and decrease fuel flow through a limited range; means coupling the power control to the main fuel regulator for control thereof; means coupling the condition control to the trimming means for setting thereof through a first range of movement of the condition control; means coupling the power control to the settable input means so that the power control determines the mode of operation of the propeller in normal operation thereof; and means coupling the condition control to the settable input means so that the condition control moves the settable input means to a position causing feathering of the propeller by movement of the condition control in a further range of movement thereof.

2. A control system as recited in claim 1 in which the main fuel regulator includes a variable-area metering valve and the trimming means includes means to vary the pressure drop across the metering valve.

3. A control system is recited in claim 2 in which the means to vary the pressure drop includes a bypass valve, a pilot valve controlling the bypass valve, the pilot valve including means responsive to metering valve pressure drop and the force of a spring actuating the pilot valve, and means for variably setting the force of the spring actuated by the condition lever.

4. A control system for a turboprop power plant including a gas turbine engine and a variable pitch feathering propeller driven thereby, the propeller having settable input means determining the mode of operation of the propeller, the control system comprising, in combination, a settable power control; a settable condition control; a fuel control including a main fuel regulator adapted to meter fuel to the engine, a settable trimming means connected to the fuel regulator adapted to increase and decrease fuel flow through a limited range, and a fuel shutoff valve; means coupling the power control to the main fuel regulator for control thereof; means coupling the condition control to the trimming means for setting thereof through a first range of movement of the condition control; means coupling the condition lever to the shutoff valve to close the valve through a second range of movement; means coupling the power control to the settable input means so that the power control determines the mode of operation of the propeller in normal operation thereof; and means coupling the condition control to the settable input means so that the condition control moves the settable input means to a position causing feathering of the propeller by movement of the condition control in a third range of movement thereof.

5. A control system for a turboprop power plant including a gas turbine engine and a variable pitch feathering propeller driven thereby, the propeller having settable input means determining the mode of operation of the propeller, the control system comprising, in combination, a settable power control; a settable condition control; a fuel control including a main fuel regulator adapted to meter fuel to the engine and a settable trimming means connected to the fuel regulator adapted to increase and decrease fuel flow through a limited range; means coupling the power control to the main fuel regulator for control thereof; means coupling the condition control to the trimming means for setting thereof through a first range of movement of the condition control; and discriminator means coupling the power and condition controls to the settable input means so that the power control determines the mode of operation of the propeller in normal operation thereof and the condition control moves the settable input means to a position causing feathering of the propeller by movement of the condition control in a further range of movement thereof.

6. A control system for a turboprop power plant including a gas turbine engine and a variable pitch feathering propeller driven thereby, the propeller having settable input means determining the mode of operation of the propeller, the control system comprising, in combination, a settable power control; a settable condition control; a fuel control including a main fuel regulator adatped to meter fuel to the engine, a settable trimming means connected to the fuel regulator adapted to increase and decrease fuel flow through a limited range, and a fuel shutoff valve; means coupling the power control to the main fuel regulator for control thereof; means coupling the condition control to the trimming means for setting thereof through a first range of movement of the condition control; means coupling the condition lever to the shutoff valve to close the valve through a second range of movement; and discriminator means coupling the power and condition controls to the settable input means so that the power control determines the mode of operation of the propeller in normal operation thereof and the condition control moves the settable input means to a position causing feathering of the propeller by movement of the condition control in a third range of movement thereof.

7. A control system for a turboprop power plant including a gas turbine engine and a variable pitch propeller driven thereby, the propeller having settable input means determining the mode of operation of the propeller, the control system comprising, in combination, a settable power control; a settable condition control; a fuel control including a main fuel regulator adapted to meter fuel to the engine, a settable trimming means connected to the fuel regulator adapted to increase and decrease fuel flow through a limited range, and a fuel shutoff valve; means coupling the power control to the main fuel regulator for control thereof; means coupling the condition control to the trimming means for setting thereof through a first range of movement of the condition control; means coupling the condition lever to the shutoff valve to close the valve through a second range of movement; and means coupling the power control to the settable input means so that the power control determines the mode of operation of the propeller in normal operation.

References Cited in the file of this patent

UNITED STATES PATENTS

| | | |
|---|---|---|
| 1,693,451 | McCauley et al. | Nov. 27, 1928 |
| 2,115,485 | Dodson | Apr. 26, 1938 |
| 2,217,364 | Halford et al. | Oct. 8, 1940 |
| 2,576,352 | Neal | Nov. 27, 1951 |
| 2,640,550 | Knapp et al. | June 2, 1953 |
| 2,664,959 | Stuart | Jan. 5, 1954 |
| 2,688,842 | Oestrich et al. | Sept. 14, 1954 |
| 2,765,800 | Drake | Oct. 9, 1956 |
| 2,781,856 | Danvers et al. | Feb. 19, 1957 |

FOREIGN PATENTS

| | | |
|---|---|---|
| 678,398 | Great Britain | Sept. 3, 1952 |